June 11, 1935.  W. B. THIEMAN  2,004,711
CORN PICKER
Filed April 23, 1926  5 Sheets-Sheet 1

Inventor
William B. Thieman
by Owing & Hagan Attys.

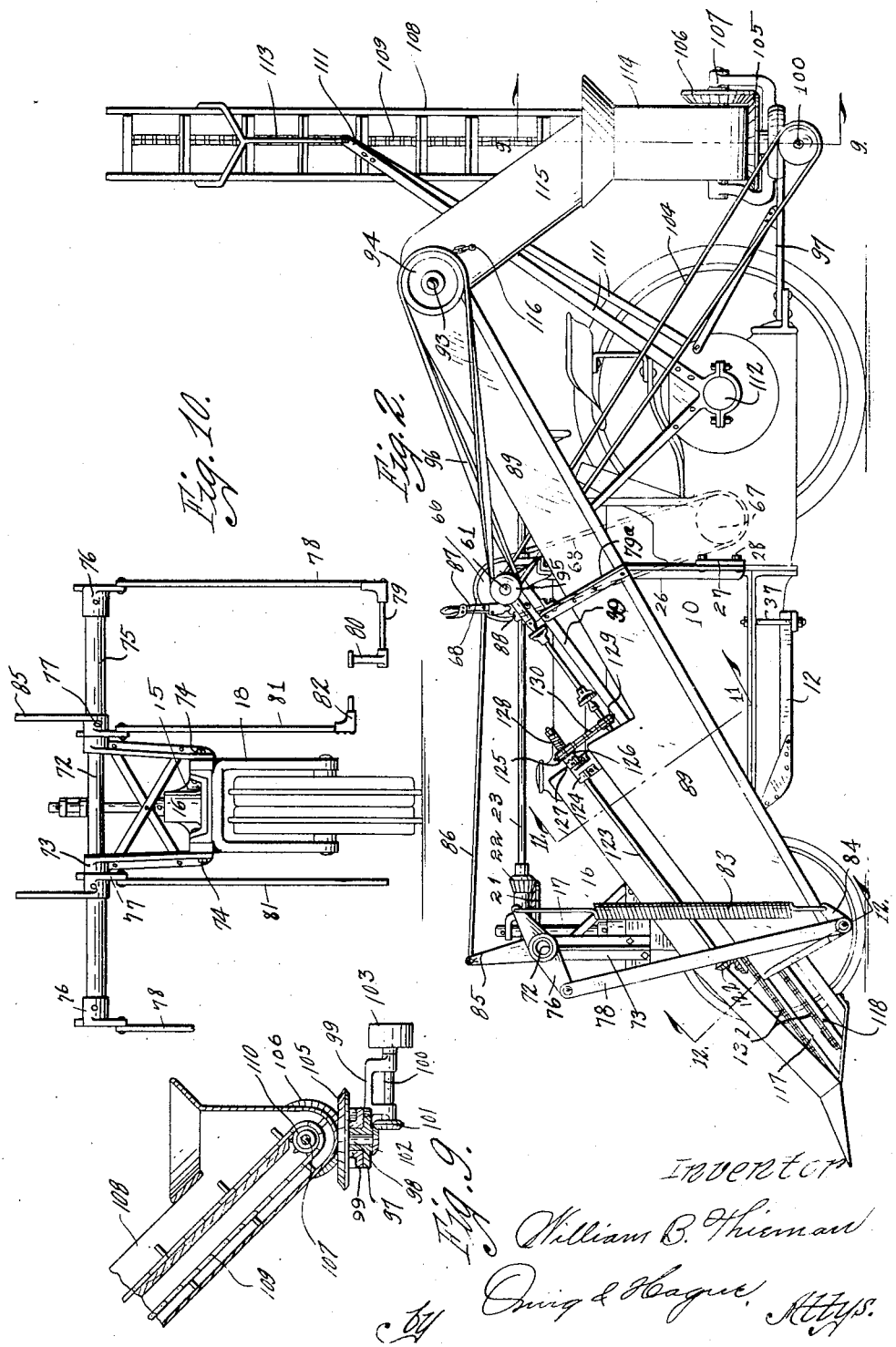

June 11, 1935.　　　　W. B. THIEMAN　　　　2,004,711
CORN PICKER
Filed April 23, 1926　　　5 Sheets-Sheet 3
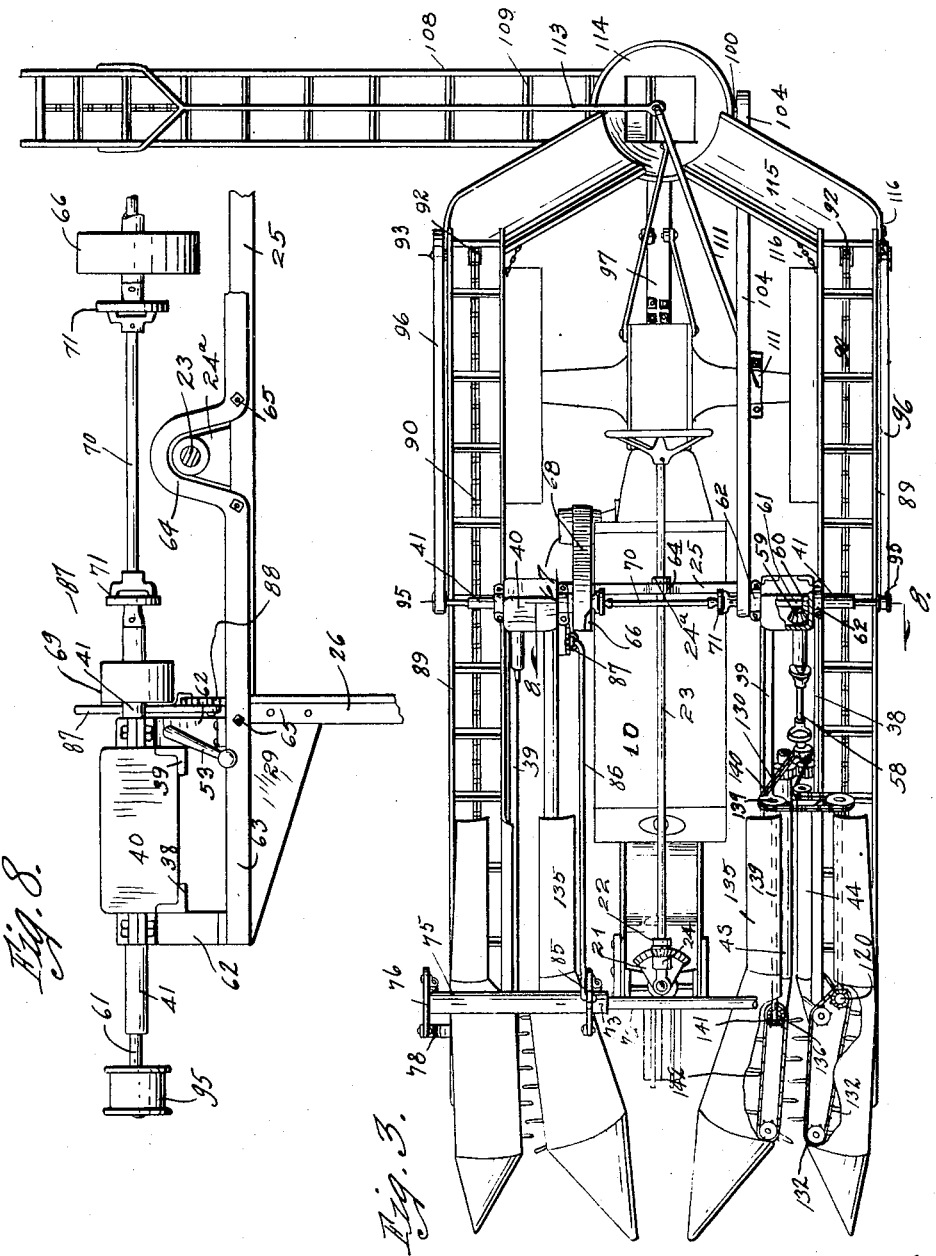

June 11, 1935.  W. B. THIEMAN  2,004,711
CORN PICKER
Filed April 23, 1926   5 Sheets-Sheet 4
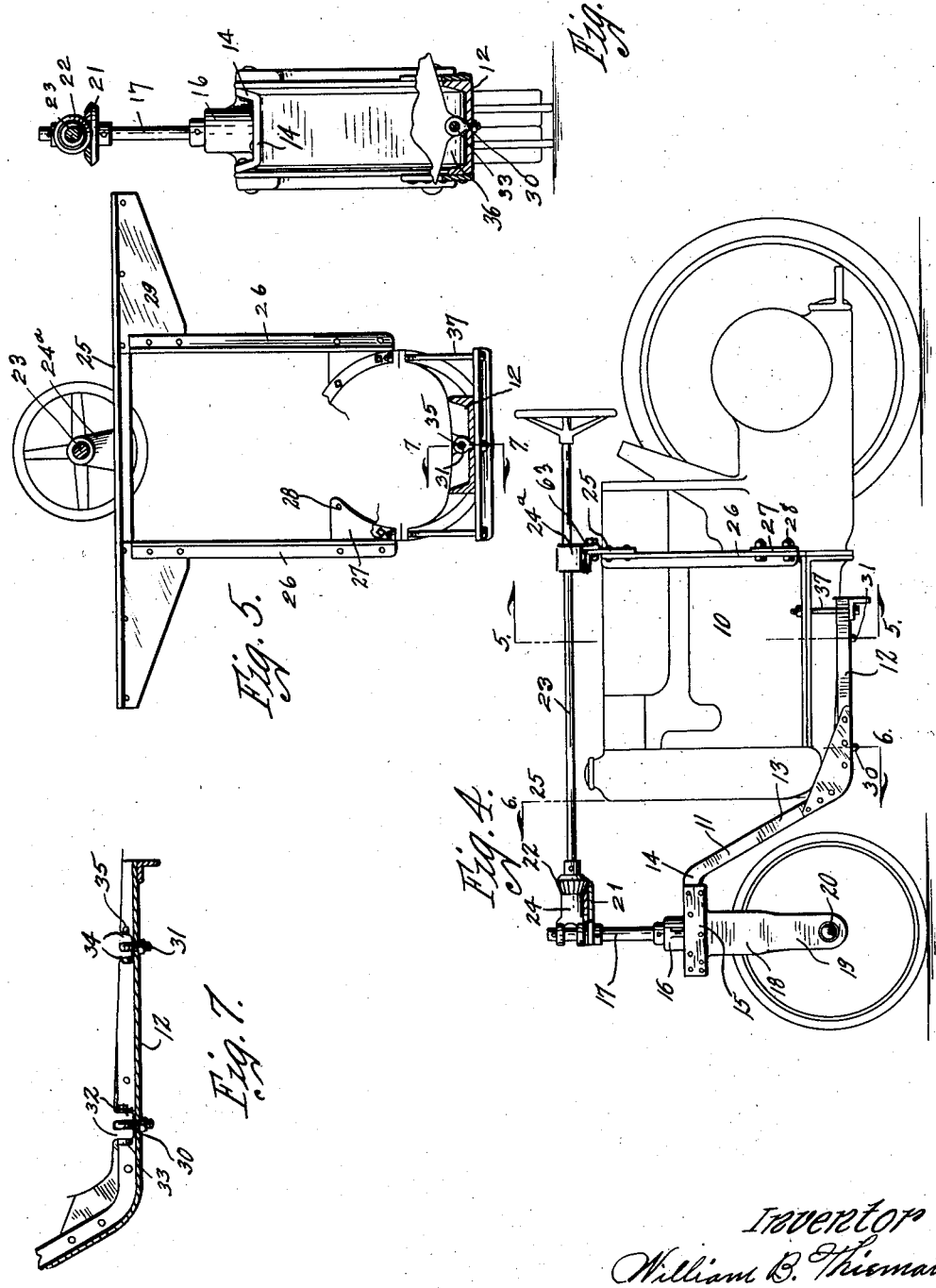
Inventor
William B. Thieman
by Orwig & Hager, Attys.

June 11, 1935.  W. B. THIEMAN  2,004,711
CORN PICKER
Filed April 23, 1926   5 Sheets-Sheet 5
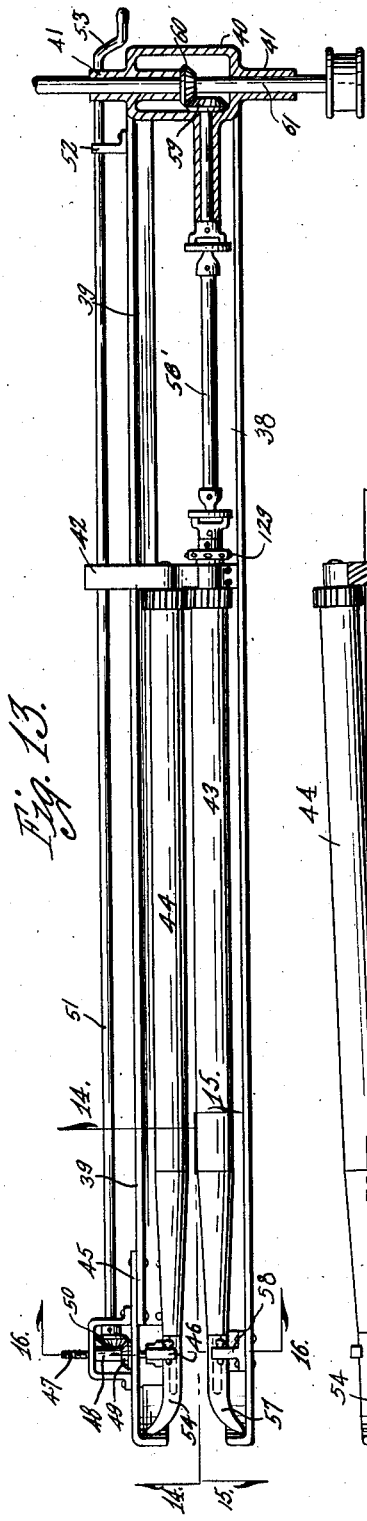
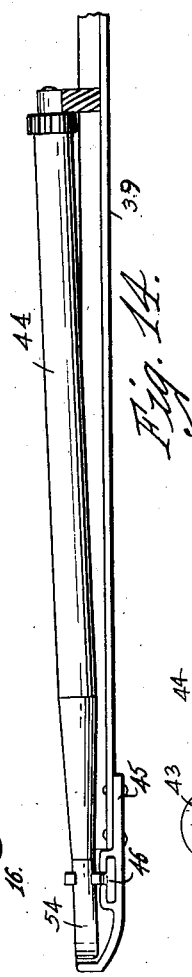
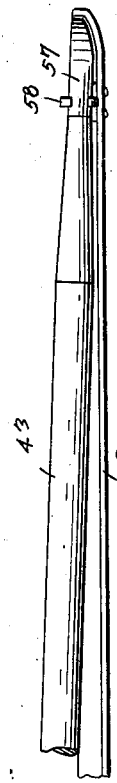
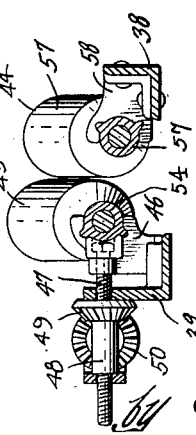
Inventor
William B. Thieman
by Ozias & Hager, Attys.

Patented June 11, 1935

2,004,711

UNITED STATES PATENT OFFICE 2,004,711

CORN PICKER

William B. Thieman, Albert City, Iowa, assignor to Deere & Company, Moline, Ill., a corporation of Illinois Application April 23, 1926, Serial No. 104,069

73 Claims. (Cl. 56—18)

The object of my invention is to provide a corn picker attachment which may be easily and quickly attached to or detached from a farm tractor such as is in common use, and so arranged that when attached, the ears of corn may be removed from two rows of stalks simultaneously and delivered to a suitable hopper, and thence to a wagon or other suitable receiving means which may be drawn alongside the picker.

A further object is to provide a corn picker attachment for farm tractors which may be easily and quickly applied without making any material changes in the tractor structure, and which is adapted to receive power from the tractor for operating the mechanism.

A further object is to provide a corn picker attachment for farm tractors which is adapted to gather two rows of corn at the same time, and to provide in connection therewith means whereby the picking mechanisms may be elevated or lowered, one of which may be operated independently of the other.

A further object is to provide in a corn picker an improved picking mechanism including a pair of snapping rollers, and means in connection therewith whereby one of the rollers may be moved slightly inwardly and outwardly relative to the other while the machine is in operation, said operating means being located at a convenient position from the operator's seat.

A further object is to provide a corn picker attachment for farm tractors adapted to gather two rows of corn at a time and to elevate and deliver the gathered corn from both of said gathering mechanisms to a single hopper, and to provide in connection therewith means for delivering the gathered corn from said hopper to a wagon drawn along either side of the picker, or the said elevating means may be moved to such a position that the wagon may be drawn by the tractor directly behind the same and the corn delivered thereto.

My invention consists in the construction, arrangement and combination of the various parts of the device, whereby the objects contemplated are attained, as hereinafter more fully set forth, pointed out in my claims, and illustrated in the accompanying drawings, in which:

Figure 2 is a side elevation of same.

Figure 3 is a plan view of my improved picker.

Figure 4 is a side elevation of a tractor showing in connection therewith the picker supporting mechanism which may be permanently attached to said tractor and to form a part thereof.

Figure 5 is a detail sectional view taken on the line 5—5 of Figure 4.

Figure 6 is a detail sectional view taken on the line 6—6 of Figure 4.

Figure 7 is a detail sectional view taken on the line 7—7 of Figure 5.

Figure 8 is an enlarged detail sectional view taken on the line 8—8 of Figure 3.

Figure 9 is a detail sectional view taken on the line 9—9 of Figure 2.

Figure 10 is a front elevation of the supporting and raising and lowering mechanism for the forward ends of the snapping and elevating mechanisms.

Figure 13 is a plan view of the main supporting frame for the snapping and gathering mechanism, showing the manner in which the snapping rollers are mounted therein, and the means for adjusting and driving said rollers.

Figure 14 is a detail sectional view taken on the line 14—14 of Figure 13.

Figure 15 is a detail sectional view taken on the line 15—15 of Figure 13.

Figure 16 is a detail sectional view taken on the line 16—16 of Figure 13.

Figure 12:
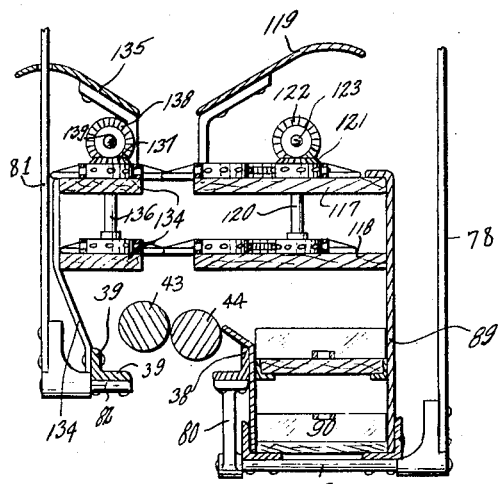
Figure 12 is a detail sectional view taken on the line 12—12 of Figure 2.

Referring to Figure 4 of the drawings, I have used the reference numeral 10 to indicate the tractor in general, in which the front axle and the steering mechanism are removed, and in place thereof I have provided what I shall term a forwardly extending wheeled support comprising a frame member 11 formed of channel iron having a horizontal portion 12 and an upwardly and forwardly extending inclined portion 13 which terminates in a horizontal portion 14. The horizontal portion 14 is supported in a bracket 15 having a vertical bearing member 16. Rotatively mounted in the bearing 16 is a shaft 17 having a yoke 18 secured to its lower end. The said yoke is provided with downwardly extending arms 19 between which the front wheels of the tractor are mounted, said wheels being removed from the regular axle and placed on a special axle 20.

The upper end of the shaft 17 is provided with a gear sector 21 designed to mesh with a pinion 22 mounted on a horizontally arranged shaft 23 which extends rearwardly and centrally above the tractor, the forward end of said shaft being rotatively mounted in a bearing member 24, which in turn is pivotally mounted on the upper end of the shaft 17. The rear end of the shaft 23 is rotatively mounted in a bearing 24a, said bearing being supported by a cross frame member 25 which extends transversely across the top of the tractor body. The said member 25 is supported by a pair of vertically arranged members 26 designed to straddle the body portion of the tractor and have a bracket member 27 at the lower end of each of said members 26. Said bracket members 27 are secured to the tractor frame by suitable bolts 28. The upper ends of the members 26 and the outer end of the member 25 are each provided with a brace plate 29. Said plates and the member 25 provide means whereby the rear end of the snapping and gathering mechanism, hereinafter described, may be easily and quickly attached to said tractor. The members 25, 26 and 27 constitute what I shall term the detachable picker supporting frame.

The member 12 is secured to the tractor by means of eye bolts 30 and 31, the bolt 30 being placed between downwardly extending lugs 32 which form a part of the tractor structure and to which the front axle of the tractor is ordinarily pivoted. The bolt 30 is secured in position thereto by a pin 33. The bolt 31 is secured between downwardly extending lugs 34 which are also a part of the tractor frame and designed to support the rear end of the radius rods. The bolt 31 is also secured in position thereto by a pin 35.

The forward end of the member 12 is provided with a saddle 36 which fits the contour of the bottom of the tractor at a point near the lugs 32 and assists in preventing transverse movement of the upper end of the member 11, relative to the tractor frame. Bolts 37 are provided in the rear end of the member 12 for the same purpose.

Thus it will be seen that I have provided in place of the ordinary steering mechanism of the tractor a detachable frame member designed to support the front wheels in close relation to each other so that they will be adapted to travel between the rows of corn so the tractor may be advanced without the front wheels running down the corn before it reaches the picker mechanism. This forwardly extending frame member also serves as a support for the forward end of the snapping and elevating mechanism.

Figure 11:
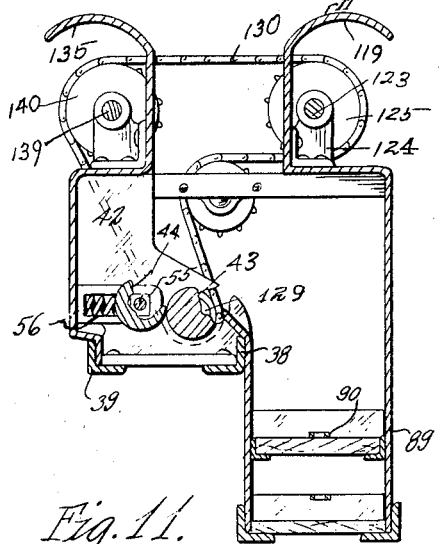
Figure 11 is a detail sectional view taken on the line 11—11 of Figure 2.
Figure 1:
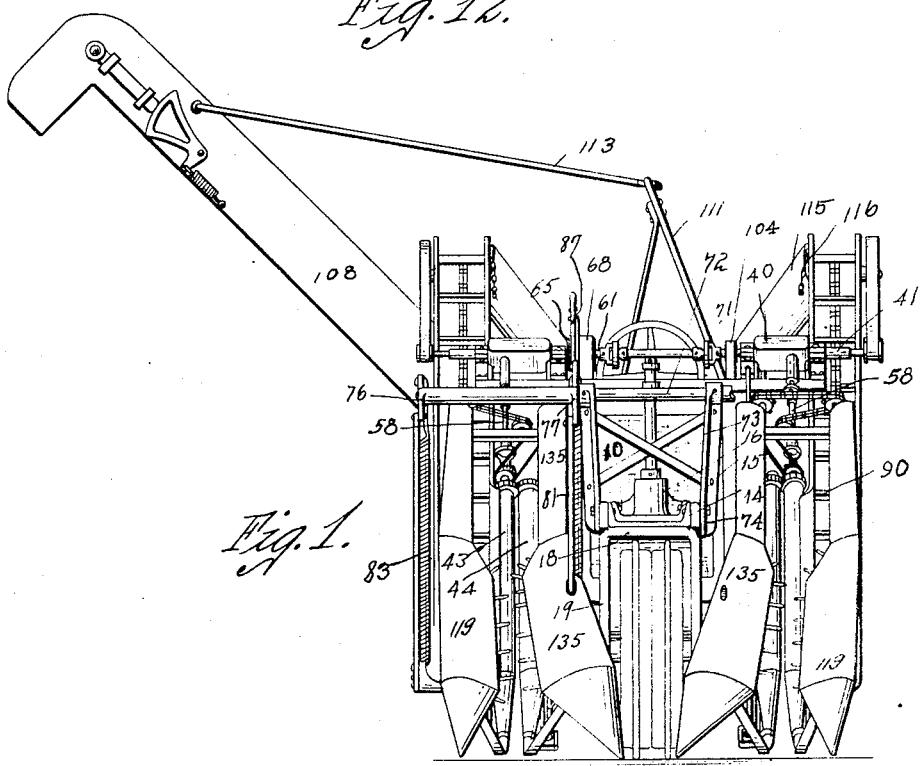
Figure 1 is a front elevation of my improved picker.

At each side of the tractor I have mounted a snapping and gathering mechanism, only one of which will be described in detail, as they are both alike, and which comprises a pair of angle irons 38 and 39 having their rear ends rigidly secured to a gear housing 40. The said housing 40 is provided with outwardly extending bearing members 41 which provide means for pivotally mounting the frame members 38 and 39 to the tractor frame, as hereinafter fully set forth. The members 38 and 39 are provided with a cross frame member 42 in which the rear ends of the snapping rollers 43 and 44 are rotatively mounted. The forward end of the member 39 is provided with a bracket 45 in which a bearing member 46 is slidably mounted to move transversely. Said bearing member 46 is provided with a screw threaded bolt 47 designed to receive a screw threaded sleeve 48 having a pinion gear 49. A gear 50 is in mesh with the said gear 49 and is mounted on a shaft 51 which extends parallel with the frame member 39 and rotatively mounted in the frame member 42 and a bearing member 52. The shaft 51 has at its rear end a crank 53. The forward end of the picker roller 44 is rotatively mounted in a bearing member 54 detachably connected in the member 46 in the manner clearly illustrated in Figure 16. The forward end of the member 54 is bent outwardly. The rear end of the roller 44 is mounted in a bearing member 55 slidably mounted in a slot 56 in the frame member 42, as clearly illustrated in Figure 11. The roller 43 is rotatively mounted in the member 42 at its rear end and in a bearing member 57 at its forward end. The bearing 57 is mounted in a bracket 58 secured to the frame member 38.

By this arrangement it will be seen that the snapping roller 44 is yieldably supported at its rear end to move toward and from the roller 43, while the forward end of the roller 44 is provided with means whereby the forward end may be moved inwardly and outwardly through the crank 53, while the machine is in operation. I am aware of the fact that it is not new to provide means for adjusting one of the rollers relative to the other to accommodate different working conditions of the corn stalks. These adjustments, however, have to be made with a wrench or similar tool after the machine has been stopped, and it is usually so located that it is very inconvenient to reach. I find by actual practice that if the corn stalks are damp the rollers have to be run quite close together, and farther apart if the stalks are dry and brittle. In the actual operation of the picker, the operator usually starts early in the morning while the dew or frost is on the stalks and while they are in a damp condition, and in the warmer part of the day, such as in the afternoon, the stalks usually become very dry and brittle, at which time it is necessary to readjust the spacing of the snapping rollers. It is also desirable to regulate them for stalks of various sizes, such for instance as the stalks at one end of the field may be comparatively small while at the opposite side they will be very large. By providing the crank 53, I have provided means whereby the adjustment may be easily and quickly made at any time desired, while without such a hand operated adjustment, it would often be impractical to stop the machine and adjust the rollers by the ordinary method now in use as many times as necessary to accomplish the best results.

The roller 43 is rotated by means of a shaft 58', the rear end of which extends into the housing 40 and is provided with a bevel gear 59, said bevel gear being driven by a bevel gear 60 mounted on a drive shaft 61 rotatively mounted in the bearing members 41. The bearing members 41 are rotatively mounted in brackets 62, which are secured to an angle iron 63 provided with an upwardly extending inverted U-shaped portion 64 at its center. The angle iron 63 is designed to be supported on the upper edge of the frame member 25 and secured thereto by suitable bolts 65, with the member 64 passing over the steering shaft 23, thus providing means whereby the frame member 63 may be elevated or lowered into position without interfering with the mounting for said shaft 23.

The inner end of one of the shafts 61 is provided with a belt wheel 66 located in alinement with the power pulley 67 of the tractor. A belt 68 is provided for operatively connecting said pulleys. The other one of the shafts 61 is provided with a belt wheel 69 for the purpose of driving the elevating conveyor, as hereinafter described. The inner ends of the two shafts 61 are connected by a short shaft 70 by means of universal joints 71, thereby providing means whereby the snapping rollers will be driven by power derived from said engine power pulley.

The forward ends of the frame members 38 and 39 are supported by means of a shaft 72 mounted in supporting members 73 detachably secured to the bracket member 15 by means of bolts 74. Each end of said shaft 72 is provided with a sleeve 75 rotatively mounted on said shaft, said sleeve being provided with rock arms 76 and 77. The forward end of the rock arm 76 is provided with a downwardly extending link 78, the lower end of which is pivoted to a horizontally and inwardly extending bar 79 having its inner end pivoted in a bracket 80. The bracket 80 is riveted to the under surface of the frame member 38. The forward end of the arm 77 is provided with a downwardly extending link 81 having at its lower end a pivotally mounted and horizontally extending bar 82 secured to the under surface of the frame member 39. The links 78 and 81 provide means whereby the forward ends of said frame members 38 and 39 may be carried from the forwardly extending frame member of the tractor.

The rearwardly extending end of each of the arms 76 and 77 is provided with a balancing spring 83, the lower end of which is connected to a bracket 84 at the lower end of said links 78 and 81. The member 77 is provided with an upwardly extending arm 85 which has a rearwardly extending rod 86 connected to a lever 87. The lever 87 is mounted on a sector 88 which is also mounted on the frame member 63. The lever 87 and the rod 86 provide means whereby the forward end of the snapping rollers may be elevated and lowered.

In this connection it will be noted that one set of snapping rollers is capable of being elevated and lowered independently of the other set, which is often desirable in case one of the rows of corn should be located in a dead furrow or ditch.

Adjacent and secured to each of the frame members 38 is a conveyor trough 89 for receiving the ears of corn from the snapping rollers, the forward end of the trough 89 being supported by means of the bar 79 between the bracket 80 and the link 78, the rear ends of the troughs 89 being supported by means of bars 79a secured to the rear ends of the frame members 39. Said conveyor trough is provided with an endless conveyor 90, the upper end of which operates over a sprocket wheel 92, mounted on a shaft 93. The outer end of the shaft 93 is provided with a belt wheel 94, while the outer end of the shaft 61 is provided with a belt wheel 95. Said belt wheels 94 and 95 are operatively connected by a belt 96. Secured to the tractor hitch is a rearwardly extending bar 97, the rear end of which is provided with a vertically arranged shaft 98 and a laterally extending bracket 99. The said bracket 99 is designed to rotatively support a shaft 100, the inner end of which is provided with a bevel gear 101 in mesh with a bevel gear 102 on the lower end of the shaft 98. The outer end of the shaft 100 is provided with a belt wheel 103 in alinement with the belt wheel 69, said belt wheels being operatively connected by a belt 104. The upper end of the shaft 98 is provided with a bevel gear 105 in mesh with a bevel gear 106 mounted on a shaft 107 located in the lower end of the main elevator 108. The lower end of said elevator is rotatively mounted about the center of the shaft 98 to swing in a horizontal plane. The elevator 108 is provided with an endless conveyor 109, the lower end of which is mounted on a sprocket 110 carried by the shaft 107.

For supporting the outer or upper end of the conveyor 109 I have provided a crane 111 detachably mounted to the rear axle 112 of the tractor. The upper end of said crane is provided with a link 113 pivotally connected to said conveyor 108. The pivot connection between said link and said crane is located in vertical alinement with the center of the shaft 98 so that the said conveyor 108 may be swung in a horizontal plane through an angle of 180°, thereby providing means whereby the wagon for receiving the picked corn may be located at either side of the snapper or it may be swung to a rearwardly extending position whereby a wagon may be attached to the tractor and drawn thereby and caused to follow directly behind the same for opening up the field.

The lower end of the elevator 108 is provided with a hopper 114 operatively connected with the delivery ends of the conveyors 89 by means of troughs 115, the upper ends of which are supported beneath the delivery end of the conveyors 89 by chains 116 to provide a pivotal connection between the upper ends of said troughs 115 and said conveyors 89 to permit the rear ends of said conveyors 89 to be swung about the shaft 61 by the levers 87 when the picking rollers are elevated and lowered.

The outer side members of the conveyors 89 are projected upwardly and carry at their forward ends gathering boards 117 and 118. The board 117 has at its inner edge an upwardly and outwardly extending gathering plate 119. A shaft 120 extends vertically through the boards 117 and 118 near their rear ends. The upper end of the shaft 120 is provided a bevel gear 121 in mesh with a bevel gear 122 mounted on the lower end of an inclined shaft 123. The upper end of said shaft is rotatively mounted in a bearing member 124 and provided with a sprocket 125 rotatively mounted on said shaft. The inner face of the hub of said sprocket is provided with a serrated portion 126 designed to engage the coacting serrated surface of a collar 127 fixed to the shaft 123. A spring 128 is provided to produce yieldable engagement between said serrated faces. The upper end of the shaft of the snapping roller 43 is provided with a sprocket in alinement with the sprocket 125, said sprockets being designed to carry a chain 130. The shaft 120 is provided with sprocket wheels 131, each of which is provided with a gathering chain 132, one of said gathering chains being located above the board 117 and the other above the board 118, as clearly shown in Figures 2, 3 and 12.

Supported above the forward end of the angle frame member 39 by means of suitable bracket 133 is a pair of gathering boards 134. The inner edge of the upper one of said boards 134 is provided with a gathering plate 135. The forward end of said plate 135 extends inwardly and ahead of the steering wheels, so that leaning stalks may be gathered up and moved outwardly toward the snapping rollers in such a manner that they will not be run over by the steering wheels. The rear and upper ends of the boards 134 are provided with a vertical shaft 136 having at its upper end a bevel gear 137 in mesh with a bevel gear 138. Said gear 138 is mounted on the forward end of an inclined shaft 139, having at its outer end a sprocket wheel 140 which is also operated through the chain 130. The shaft 136 is provided with sprockets 141 designed to carry gathering chains 142, one of which is supported above one of the boards 134 and the other one above the other one of said boards 134.

Thus it will be seen that I have provided means for operating the gathering chains 132 and 142 from the shaft 58 by means of the sprocket and the gearing mechanism just described.

Thus it will be seen that I have provided a corn picker attachment which may be easily and quickly applied to a farm tractor or removed therefrom. The device may be removed by first removing the troughs 115 and then detaching the member 113 from the crane 111, then detaching the member 97 from the tractor hitch, which will permit the elevator 108 and the hopper 114 to be removed, the belt 104 being previously removed, after which the belt 68 may be removed from the pulleys 66 and 67, then the bolts 65 from the frame member 63, after which the bolts 74 may be removed from the bracket member 15, after which the frame member 63 together with the rear ends of the frame members 38 and 39 may be elevated. The forward ends of the gathering plates 119 and 135 are supported on the ground surface, or a suitable block. It will then be seen that the tractor may be backed from beneath the said frame member 63, causing the supporting members 73 to disengage the bracket 15, thereby providing means whereby the snapper attachment may be easily and quickly removed. The frame member 25 and the member 11 may be left permanently on the tractor if so desired, as clearly shown in Figure 4.

It will further be seen that the mechanism may be easily and quickly applied by reversing the operation just described, and when so applied it will be seen that I have provided a snapper attachment for farm tractors which is so arranged that the corn will be gathered and delivered to the snapping rollers before it has been engaged by any part of the tractor, thereby eliminating a large amount of corn being knocked from the stalks and delivered to the ground, after which it cannot be gathered by the machine.

It will also be seen that I have provided means whereby two rows of corn may be gathered simultaneously, and means whereby either of the gathering and snapping mechanisms may be elevated and lowered independently of the other, and provided with means whereby the tension of the snapping rollers may be varied while the machine is in operation. The crank mechanism for varying said rollers is located at a convenient position from the operator's seat.

A considerable advantage is gained by providing a delivery elevator which may be swung through an angle of 180°, as it will be seen by this arrangement that the gathering may be started at one side of the field and the rows gathered successively from said side, instead of having to cut the field into lands as is necessary with a machine in which the delivery takes place on only one side.

It will further be seen that in case it should be desirable to cut the field into lands, this can be accomplished without having to husk any rows by hand as the said elevator may be swung through an angle of 90° to the position in longitudinal alinement with the tractor, and caused to deliver the corn to a wagon drawn by said tractor. When the ground conditions are good, it may be sometimes desirable to operate the machine this way, and save the expense of a team and driver. In other words, the entire snapping mechanism may be operated by one man instead of two or three as is necessary with the machines now in use.

It is my intention to provide a separate machine at the crib for husking the corn after it has been snapped, thereby eliminating the necessity of carrying a large and heavy machine over the ground surface. A large part of the corn, however, is fed for fattening cattle without being husked.

I claim as my invention:

1. In combination, a tractor having a forwardly extending wheeled support, a gathering, snapping and conveying device adjacent to each side of said tractor, means for pivotally mounting one end of each of said devices to said tractor frame, a transversely arranged shaft carried by said forwardly extending wheeled support, a sleeve rotatively mounted on each end of said shaft, said sleeve being provided with rock arms, links carried by said rock arms, means for pivotally connecting the lower ends of said links with the forward ends of said gathering, snapping and conveying devices, and means for rotating either of said sleeves independently of the other.

2. In combination, a tractor having a forwardly extending wheeled support, a gathering, snapping and conveying device adjacent to each side of said tractor, means for pivotally mounting one end of each of said devices to said tractor frame, a transversely arranged shaft carried by said forwardly extending wheeled support, a sleeve rotatively mounted on each end of said shaft, said sleeve being provided with rock arms, links carried by said rock arms, means for pivotally connecting the lower ends of said links with the forward ends of said gathering, snapping and conveying devices, means for rotating either of said sleeves independently of the other, and means for counterbalancing the weight of the forward ends of said gathering, snapping and conveying devices.

3. In combination, a tractor having a forwardly extending wheeled support, a gathering, snapping and conveying device adjacent to each side of said tractor, means for pivotally mounting each of said devices to said tractor, means carried by said forwardly extending wheeled support for supporting the forward ends of said gathering, snapping and conveying devices, means carried by the last said means for independently raising and lowering the forward ends of said gathering, snapping and conveying devices, an elevator pivotally mounted on the rear end of said tractor adapted to swing through an angle of 180°, means for delivering snapped corn from both of said conveying means to said elevator, means for operating said gathering, snapping and conveying devices from said tractor, and means for operating said elevator from said tractor when said elevator is in any of its horizontal positions of movement.

4. A snapper attachment for farm tractors comprising a transversely arranged frame member, two pairs of bearing members carried thereby, an inclined frame pivotally mounted in each pair of bearing members, a transversely arranged shaft, a sleeve rotatively mounted on each end of said shaft, each end of said sleeve being provided with a rock arm, a link depending from each of said rock arms, means for pivotally securing each pair of said depending links to the lower end of each of said inclined frame members, a rod for one of each pair of rock arms, a lever for each of said rods, said levers being mounted on said transversely arranged frame member, a supporting frame for carrying the central portion of said transversely arranged shaft, means for detachably connecting said supporting frame to the front end of a tractor frame, means for detachably connecting said transversely arranged frame member to a point above and near the rear end of said tractor, gathering, snapping and conveying means carried by each of said inclined frame members, means carried by said transversely arranged frame member for simultaneously imparting movement to each set of gathering, snapping and conveying mechanisms, and means for operatively connecting the last said means with the power pulley of a tractor.

5. In combination, a tractor having its forward end carried by a detachable frame member extending upwardly and forwardly from the bottom side of the front end of said tractor, a wheel supporting and steering mechanism carried by said forwardly extending frame member, a transversely arranged frame member supported above the rear end of said tractor body, said frame member being provided with a pair of downwardly extending supports, means for attaching the lower ends of each of said supports to laterally extending flanges on said tractor body, means for detachably connecting said forwardly and upwardly extending frame member to said tractor, a second transversely arranged frame member detachably connected to the first transverse frame member, a transversely arranged shaft, a support connected to the central portion of said shaft, means for detachably connecting the last said support with the upwardly and forwardly extending frame member, an inclined frame member pivotally connected to each end of the said second transversely arranged frame member, means carried by each end of said transversely arranged shaft and pivotally connected to the lower end of each of said inclined frame members for elevating and lowering the forward end of said frame member, gathering, snapping and conveying means carried by each of said inclined frame members, and means actuated by the power pulley of the tractor for imparting motion to both sets of the gathering, snapping and conveying means.

6. In combination, a tractor having its forward end carried by a detachable frame member extending upwardly and forwardly from the bottom side of the front end of said tractor, a wheel supporting and steering mechanism carried by said forwardly extending frame member, a transversely arranged frame member supported above the rear end of said tractor body, said frame member being provided with a pair of downwardly extending supports, means for attaching the lower ends of each of said supports to laterally extending flanges on said tractor body, means for detachably connecting said forwardly and upwardly extending frame member to said tractor, a second transversely arranged frame member detachably connected to the first transverse frame member, a transversely arranged shaft, a support connected to the central portion of said shaft, means for detachably connecting the last said support with the upwardly and forwardly extending frame member, an inclined frame member pivotally connected to each end of the second said transversely arranged frame member, elevating and lowering means carried by each end of said transversely arranged shaft and pivotally connected to the lower end of each of said inclined frame members, gathering, snapping and conveying means carried by each of said inclined frame members, means actuated by the power pulley of the tractor for imparting motion to both sets of the gathering, snapping and conveying means, a bracket extending rearwardly from said tractor, an elevator pivotally mounted to swing in a horizontal plane through an angle of substantially 180°, means for conveying corn from both sets of said conveying means to said elevator when in any of its positions of movement, and means for imparting movement from said tractor power pulley to said elevator when said elevator is in any of its positions of pivotal movement.

7. A snapping mechanism for portable harvesters, comprising a frame member, a pair of snapping rollers rotatively mounted therein, one of said rollers being movable toward and from the other, one end of said movable roller being mounted in a yieldable bearing member, the other end of said movable roller being mounted in a transversely movable bearing member, means for imparting movement to said bearing member comprising a transversely arranged screw threaded shaft, a screw threaded sleeve rotatively mounted thereon and within a bearing member secured to said frame member to limit said sleeve against transverse movement, a gear for said sleeve, a bevel gear in mesh with said gear, a shaft for supporting the last said bevel gear, said shaft running parallel with the longitudinal axis of said frame member, and means mounted on the rear end of said shaft for imparting rotation thereto.

8. A snapping mechanism for portable harvesters, comprising a main frame, an inclined frame member pivotally mounted on said main frame for movement in a vertical plane, a pair of snapping rollers carried by said inclined frame member, one of said rollers being movably mounted toward and from the other, yieldable means for retaining the rear end of said movable roller in spaced relation with its coacting roller, hand actuated means for imparting inward and outward movement to the forward end of said movable snapping rollers, the last said means including a shaft extending parallel with and terminating near the point of pivotal connection of said inclined frame member with said main frame.

9. A portable harvester having an operator's station from which the operation of the harvester is controlled comprising a main frame, an inclined frame member pivoted to said main frame on a transverse axis in proximity to said operator's station, means for supporting and moving said frame member over the ground surface, a pair of snapping rollers carried by said inclined frame member, one of said rollers being movably mounted toward and from the other, yieldable means for retaining the rear end of said movable roller into engagement with its coacting roller, and means including a control element extending to a point near the point of pivotal connection of said inclined frame member with said main frame for changing the normal spacing between the snapping rolls and for rigidly fixing said forward ends in any of their adjusted positions.

10. The combination with a corn harvester comprising two sets of downwardly and forwardly inclined snapping rolls positioned in proximity to operate on adjacent corn rows, of means for varying the inclination of each set of snapping rolls independently of the other set at will.

11. The combination with a tractor propelled corn harvester comprising two sets of downwardly and forwardly inclined snapping rolls adapted to be positioned on opposite sides of the tractor opposite the steering means thereof, of means for varying the inclination of each set of snapping rolls independently of the other set at will.

12. A tractor propelled corn harvester comprising two harvesting mechanisms positioned in proximity to operate on adjacent corn rows, each mechanism comprising a set of downwardly and forwardly inclined snapping rolls and a longitudinally positioned conveyor for conveying the ears of corn from the snapping rolls toward the rear, said mechanism being adapted to be rockably mounted on opposite sides of the tractor, and means for rocking each mechanism independently of the other at will.

13. A tractor propelled corn harvester comprising two harvesting mechanisms adapted to be mounted on opposite sides of a tractor, each mechanism comprising a set of downwardly and forwardly inclined snapping rolls and a longitudinally positioned conveyor for conveying the ears of corn from the snapping rolls towards the rear, a common drive shaft for operating said mechanisms, a housing on each end of said shaft for supporting the shaft, said mechanisms being supported on said housings respectively and means for independently rocking said mechanisms about the axis of said drive shaft.

14. A tractor propelled corn harvester comprising two sets of snapping rolls carried by the tractor, one on each side and opposite the steering means thereof, two longitudinally extending conveyors positioned on opposite sides of the tractor, one for each set of rolls, for conveying the ears of corn from the rolls to the rear of the tractor, chutes extending downwardly and inwardly from the ends of said conveyors, and an elevator at the rear of the tractor and centrally thereof for receiving the ears from the conveyors and for delivering them into a wagon.

15. A tractor propelled corn harvester comprising two sets of snapping rolls carried by the tractor near the front end thereof, two longitudinally extending conveyors positioned on opposite sides of the tractor, one for each set of rolls, for conveying the ears of corn from the rolls to the rear of the tractor, an elevator at the rear of the tractor having a hopper, and a chute for each conveyor pivotally supported near the end thereof and leading into said hopper.

16. A tractor propelled harvester comprising two harvesting mechanisms, each mechanism comprising a set of downwardly and forwardly inclined gathering means and a longitudinally positioned conveyor extending rearwardly, said mechanisms being rockably supported on opposite sides of the tractor with said gathering means opposite the steering means thereof, and means for rocking each mechanism independently of the other at will.

17. A harvester for harvesting row crops, comprising a wheel supported frame, row following harvesting mechanism pivotally supported from said frame for movement in a vertical plane, a transverse shaft carried by said frame, a sleeve rotatably mounted on said shaft and having an arm on each end thereof, and connections from the ends of said arms extending downwardly on opposite sides of said mechanism, said sleeve, arms, and connections holding the two sides of said mechanism in transverse alignment.

18. A harvester for harvesting row crops, comprising a wheel supported frame, row following harvesting mechanism pivotally supported from said frame for movement in a vertical plane, a transverse shaft carried by said frame, a sleeve rotatably mounted on said shaft and having an arm on each end thereof, connections from the ends of said arms extending downwardly on opposite sides of said mechanism, said sleeve, arms, and connections holding the two sides of said mechanism in transverse alignment, and means for rotating said sleeve to raise said mechanism.

19. A harvester for harvesting row crops, comprising a wheel supported frame, row following harvesting mechanism, said mechanism being mounted on a frame pivotally supported on said supporting frame for movement in a vertical plane, said frame having two forwardly extending portions separated at their front ends to form a throat-way into which the row is guided, a transverse shaft carried by said supporting frame, a sleeve rotatably mounted on said shaft and having an arm on each end, and connections extending from said arms to said forwardly extending frame portion, respectively, said sleeve, arms, and connections holding said frame portions in the same plane.

20. A harvester for harvesting row crops, comprising a wheel supported frame, row following harvesting mechanism, said mechanism being mounted on a frame pivotally supported on said supporting frame for movement in a vertical plane, said frame having two forwardly extending portions separated at their front ends to form a throat-way into which the row is guided, a transverse shaft carried by said supporting frame, a sleeve rotatably mounted on said shaft and having an arm on each end, and means pivotally connected to said arms and to said frame portions, holding said portions in the same plane.

21. A harvester for harvesting row crops, comprising a wheel supported frame, row following harvesting mechanism, said mechanism being mounted on a frame pivotally supported on said supporting frame for movement in a vertical plane, said frame having two forwardly extending portions separated at their front ends to form a throat-way into which the row is guided, a connection bridging said portions to hold said portions in the same plane, said connection including a rockable member, and means for rocking said member to raise said harvesting mechanism.

22. A harvester for harvesting row crops, comprising a wheel supported frame, row following harvesting mechanism pivotally supported from said frame for movement in a vertical plane, a transverse shaft carried by said frame, a sleeve rotatably mounted on said shaft and having an arm on each end thereof, connections from the ends of said arms extending downwardly on opposite sides of said mechanism, said sleeve, arms, and connections holding the two sides of said mechanism in transverse alignment, a third arm on said sleeve, and a counter-balancing spring connected between the end of said third arm and said mechanism.

23. A harvester for harvesting row crops, comprising a wheel supported frame, row following harvesting mechanism, said mechanism being mounted on a frame pivotally supported on said supporting frame for movement in a vertical plane, said frame having two forwardly extending portions separated at their front ends to form a throat-way into which the row is guided, a connection bridging said portions to hold said portions in the same plane, said connection including a rockable member, means for rocking said member to raise said harvesting mechanism, and counter-balancing mechanism connected between said rockable member and said harvesting mechanism.

24. A harvester for harvesting row crops, comprising a wheel supported frame, two row following harvesting mechanisms pivotally supported from opposite sides of said frame for movement in vertical planes, a transverse shaft carried by said frame, a sleeve rotatably mounted on each end of said shaft, each sleeve having an arm on each end, and connections from the ends of said arms extending downwardly on opposite sides of said mechanisms.

25. A harvester for harvesting row crops, comprising a wheel supported frame, two row following harvesting mechanisms pivotally supported from opposite sides of said frame for movement in vertical planes, a transverse shaft carried by said frame, a sleeve rotatably mounted on each end of said shaft, each sleeve having an arm on each end, connections from the ends of said arms extending downwardly on opposite sides of said mechanism, and means for rotating said sleeves to raise said mechanisms.

26. A harvesting mechanism comprising a main frame, two cooperating gathering devices pivotally supported on said main frame for movement in a vertical plane, one of which devices is adjustable for varying the operative position of one device with respect to the other, hand actuated means for effecting said adjustment, said last means including a shaft extending to a point in close proximity to the point of pivotal connection of said gathering devices with said main frame, and means on the end of said shaft for operating the same.

27. A self propelled corn harvester comprising a tractor having a relatively narrow body supported on rear traction wheels and a front truck of a width not greater than the width of the tractor body, two sets of snapping rolls on opposite sides of the tractor body positioned in the vicinity of said truck and in close proximity thereto to operate on adjacent corn rows, a longitudinally extending conveyor extending rearwardly from each set of snapping rolls for conveying the ears of corn from the rolls to the rear of the tractor, and an elevator detachably mounted on the rear of the tractor and positioned for receiving the ears from the conveyors and for delivering them into a wagon.

28. A self propelled corn harvester comprising a tractor having a relatively narrow body supported on rear traction wheels and a front truck of a width not greater than the width of the tractor body, two sets of snapping rolls on opposite sides of the tractor body positioned in the vicinity of said truck and in close proximity thereto to operate on adjacent corn rows, a longitudinally extending conveyor extending rearwardly from each set of snapping rolls for conveying the ears of corn from the rolls to the rear of the tractor, an elevator detachably mounted on the rear of the tractor and centrally thereof, and a downwardly and inwardly inclined chute extending from the end of each conveyor for conducting the ears from the conveyors to the elevator.

29. A self propelled harvester comprising a tractor having a relatively narrow body supported on rear traction wheels and a front truck of a width not greater than the width of the tractor body, two harvesting mechanisms, each mechanism comprising a downwardly and forwardly inclined gathering means and rearwardly extending conveying means associated therewith in a fixed position, said mechanisms being positioned on opposite sides of the tractor body in close proximity thereto, with the gathering means on opposite sides of said truck, said mechanisms being tiltable about a transverse axis relatively to said tractor, and an elevator detachably mounted on the rear of said tractor and positioned to receive crop from said conveyors.

30. A self propelled harvester comprising a tractor having a relatively narrow body supported on rear traction wheels and a front truck of a width not greater than the width of the tractor body, two harvesting mechanisms each mechanism comprising crop gathering means and rearwardly extending conveying means associated therewith, said mechanisms being positioned on opposite sides of the tractor body in close proximity thereto and connected with the tractor to be propelled thereby, the gathering means thereof being positioned near said truck, an elevator separately mounted on the rear of the tractor and having a receiving end positioned substantially centrally of the tractor body, and means for conducting crop from said conveyors into the receiving end of said elevator.

31. In combination with a tractor having a rearwardly extending drawbar normally serving as a means for pivotally connecting pulled implements, of a row crop harvesting mechanism comprising crop gathering means positioned near the front of the tractor, and a conveyor extending rearwardly therefrom adapted to receive crop from said gathering means and convey it towards the rear of the tractor, said mechanism being tiltable in a vertical plane with respect to said tractor, an elevator detachably mounted on said drawbar, and means for directing crop from the end of said conveyor to said elevator.

32. A tractor propelled corn harvester comprising two sets of snapping rolls positioned on opposite sides of the tractor near the front end thereof, a longitudinally extending conveyor extending rearwardly from each set of snapping rolls for conveying the ears of corn from the rolls to the rear of the tractor, an elevator at the rear of the tractor having a hopper, and a chute for each conveyor pivotally supported near the end thereof and leading into said hopper.

33. A harvester for harvesting row crops, comprising a wheel supported frame, row following harvesting mechanism pivotally supported from said frame for movement in a vertical plane, a transverse member rotatably mounted on said frame and having an arm on each end thereof, and connections from the ends of said arms extending downwardly on opposite sides of said mechanism, said member, arms, and connections maintaining said mechanism in a longitudinal vertical plane.

34. A harvester for harvesting row crops, comprising a wheel supported frame, row following harvesting mechanism pivotally supported from said frame for movement in a vertical plane, a transverse member rotatably mounted on said frame and having an arm on each end thereof, connections from the ends of said arms extending downwardly on opposite sides of said mechanism, said member, arms, and connections maintaining said mechanism in a longitudinal vertical plane, and means for rotating said member to raise said mechanism.

35. The combination with a row crop harvester comprising two sets of harvesting mechanisms positioned in proximity to operate on adjacent rows, said mechanisms being independently rockable about a common transverse axis, of means for rocking each mechanism independently of the other at will to vary the operating position thereof relative to the ground.

36. A self propelled harvester comprising a tractor having a relatively narrow body supported on rear traction wheels and a front truck of a width not greater than the width of the tractor body, two harvesting mechanisms each mechanism comprising crop gathering means and rearwardly extending conveying means associated therewith, said mechanisms being positioned on opposite sides of the tractor body in close proximity thereto and connected with the tractor to be propelled thereby, an elevator separately mounted on the rear of the tractor and having a receiving end positioned to receive crop from said conveyors.

37. A tractor propelled row crop harvester comprising two sets of gathering means positioned on opposite sides of the tractor near the front end thereof, a longitudinally extending conveyor extending rearwardly from each gathering means for conveying the crop to the rear of the tractor, an elevator at the rear of the tractor having a hopper, and a chute for each conveyor pivotally supported near the end thereof and leading into said hopper.

38. A tractor propelled row crop harvester comprising two harvesting mechanisms positioned on opposite sides of the tractor in close proximity thereto, each mechanism comprising gathering mechanism positioned near the front of the tractor and a conveyor extending rearwardly therefrom for receiving crop from said gathering means and conveying it to the rear of the tractor, an elevator at the rear of the tractor and positioned substantially on the longitudinal center line of the tractor, and chutes extending downwardly and inwardly from the end of said conveyors for conducting crop from the end of said conveyors into said elevator.

39. A self propelled harvester comprising a tractor having a relatively narrow body supported on rear traction wheels and a front truck of a width not greater than the width of the tractor body, two crop gathering mechanisms on opposite sides of the tractor body positioned in the vicinity of said truck and in close proximity thereto to operate on adjacent corn rows, a longitudinally extending conveyor extending rearwardly from each mechanism and disposed in close proximity to the tractor body for conveying the crop from said mechanisms to the rear of the tractor, and means at the rear of the tractor for receiving the crop from said conveyors.

40. A self propelled harvester comprising a tractor having a relatively narrow body supported on rear traction wheels and a front truck of a width not greater than the width of the tractor body, two harvesting mechanisms each mechanism comprising crop gathering means and rearwardly extending conveying means associated therewith, said mechanisms being positioned on opposite sides of the tractor body in close proximity thereto and connected with the tractor to be propelled thereby, the gathering means thereof being positioned near said truck, and means at the rear of the tractor for receiving the crop from said conveying means.

41. A self propelled harvester comprising a tractor having a relatively narrow body supported on rear traction wheels and a front truck of a width not greater than the width of the tractor body, two crop gathering mechanisms on opposite sides of the tractor body positioned in the vicinity of said truck and in close proximity thereto to operate on adjacent rows, said mechanisms being rockable about a common transverse axis to raise and lower the front end thereof, a longitudinally extending conveyor extending rearwardly from each mechanism and disposed in close proximity to the tractor body for conveying the crop from said mechanisms to the rear of the tractor, and means at the rear of the tractor for receiving the crop from said conveyors.

42. A self propelled harvester comprising a tractor having a relatively narrow body supported on rear traction wheels and a front truck of a width not greater than the width of the tractor body, two harvesting mechanisms positioned on opposite sides of the tractor body in close proximity thereto and adjacent said truck, said mechanisms being rockable in a vertical plane about a transverse axis located rearwardly of said truck and forwardly of said traction wheels, relatively narrow conveying means extending rearwardly from said harvesting mechanisms for conveying the harvested crop to the rear of the tractor, a common drive shaft mounted on the tractor coincident with said transverse axis for driving both of said harvesting mechanisms and said conveyors, and means for driving said common drive shaft from the motor of the tractor.

43. A self propelled harvester comprising a tractor having a relatively narrow body supported on rear traction wheels and a front truck of a width not greater than the width of the tractor body, two harvesting mechanisms positioned on opposite sides of the tractor body in close proximity thereto and adjacent said truck, said mechanisms being rockable in a vertical plane about a transverse axis located rearwardly of said truck and forwardly of said traction wheels, transverse members rockably mounted on the tractor near the forward end thereof, lifting connections from said members to the forward end of each of said harvesting mechanisms, and means for rocking said members for adjusting the vertical position of said harvesting mechanisms.

44. A self propelled harvester comprising a tractor having a relatively narrow body supported on rear traction wheels and a front truck of a width not greater than the width of the tractor body, a crop gathering mechanism positioned in close proximity to the tractor body and adjacent said truck, said mechanism being rockable in a vertical plane about a transverse axis located rearwardly of said truck and forwardly of said traction wheels, a transverse member rockably mounted on the tractor near the forward end thereof, lifting connections from said member to the forward end of said mechanism and means for rocking said member for adjusting the vertical position of said harvesting mechanism.

45. A self propelled harvester comprising a tractor having a relatively narrow body and a pair of traction wheels, a forwardly extending frame detachably connected to the tractor body at its rear end, said frame being wheel supported at its forward end, two harvesting mechanisms positioned on opposite sides of the tractor body and pivotally connected thereto for movement in a vertical plane about a transverse axis adjacent the traction wheels, rocking members supported on said forwardly extending framework, lifting connections between said rocking members and the forward ends of said harvesting mechanisms, and means for rocking said rocking member for raising and lowering said harvesting mechanisms.

46. A self propelled harvester comprising a tractor having a relatively narrow body supported on rear traction wheels and a front truck of a width not greater than the width of the tractor body, two crop gathering mechanisms on opposite sides of the tractor body positioned in the vicinity of said truck and in close proximity thereto to operate on adjacent rows, a longitudinally extending conveyor extending rearwardly from each mechanism for conveying the crop therefrom to the rear of the tractor, and an elevator at the rear of the tractor and positioned to receive crop from both of said conveyors and deliver it into a wagon.

47. A self propelled harvester comprising a tractor having a relatively narrow body supported on rear traction wheels and a front truck of a width not greater than the width of the tractor body, two crop gathering mechanisms on opposite sides of the tractor body positioned in the vicinity of said truck and in close proximity thereto to operate on adjacent rows, a longitudinally extending conveyor extending rearwardly from each mechanism for conveying the crop therefrom to the rear of the tractor, chutes extending downwardly and inwardly from the ends of said conveyors, and an elevator at the rear of the tractor and disposed centrally thereof for receiving the crop from said chutes and delivering it into a wagon.

48. A self propelled harvester comprising a tractor having a relatively narrow body supported on rear traction wheels and a front truck of a width not greater than the width of the tractor body, two harvesting mechanisms positioned on opposite sides of the tractor body in close proximity thereto and adjacent said truck, said mechanisms being rockable in a vertical plane about a transverse axis located rearwardly of said truck and forwardly of said traction wheels, relatively narrow conveying means extending rearwardly from said harvesting mechanisms for conveying the harvested crop to the rear of the tractor, an elevator mounted at the rear of the tractor and positioned to receive crop from both of said conveyors and deliver it into a wagon, a common drive shaft mounted on the tractor coincident with said transverse axis for driving both of said harvesting mechanisms, said conveyors and said elevators, and means for driving said common drive shaft from the motor of the tractor.

49. A tractor propelled row crop harvester comprising two sets of crop gathering mechanisms positioned on opposite sides of the tractor near the front end thereof, a longitudinally extending conveyor extending rearwardly from each mechanism for conveying the crop therefrom to the rear of the tractor, an elevator at the rear of the tractor having a hopper, and a chute for each conveyor pivotally supported near the end thereof and leading into said hopper.

50. A harvester for harvesting row crops comprising a wheel supported frame, a row following harvesting mechanism pivotally supported from said frame for movement in a vertical plane, a transverse member rotatably mounted on said frame having a pair of spaced arms fixed thereto, connections from the ends of said arms extending downwardly and connected to opposite sides of said mechanism, said member, arms and connections maintaining said mechanism in a longitudinal vertical plane, and means for rotating said member to raise said mechanism.

51. The combination with a row crop harvester comprising two sets of harvesting mechanisms positioned in proximity to operate on adjacent rows, said mechanisms being independently rockable about a common transverse axis, of means for rocking each mechanism independently of the other at will to vary the operating position thereof relative to the ground, and a common drive shaft coincident with said common transverse axis for driving both of said harvesting mechanisms.

52. A corn harvesting machine comprising a tractor, rear wheels on said tractor adapted to run along adjacent rows of corn, a front rolling support for said tractor, said tractor having a narrow longitudinally and centrally extending body portion, and picking means mounted at each side of the body portion intermediate the rear wheels and the front rolling support and positioned to pick corn from said adjacent rows.

53. A corn harvesting machine comprising a tractor, rear wheels on said tractor adapted to run along adjacent rows of corn, a narrow longitudinally and centrally extending body, a front rolling support for said body, picking means mounted on each side of the body intermediate the rear wheels and said front support, and conveying means positioned at each side of the tractor adapted to receive corn from the picking means and deliver it upwardly over the rear wheels.

54. A corn harvesting machine comprising a tractor, rear wheels on said tractor adapted to run along adjacent rows of corn, a narrow longitudinally and centrally extending body, a front rolling support for said body adapted to run between the adjacent rows of corn being picked, picking means mounted on each side of the body intermediate the rear wheels and said front support, and conveying means positioned at each side of the tractor adapted to receive corn from the picking means and deliver it upwardly over the rear wheels.

55. A device as set forth in claim 53, in which means is disposed on the front end of the picking means for lifting corn stalks leading into the path of the front rolling support and directing them toward the picking means.

56. A corn harvesting machine comprising the combination of a tractor having a transversely extended rear axle structure supported on wheels adapted to run along adjacent rows of corn, a narrow body extending forwardly from the center of the axle structure, a front rolling support on the body adapted to run between the same rows, a transverse support on the body in advance of the rear wheels, picking means pivotally mounted on the ends of said support, said means being operable to pick corn from adjacent rows, and gathering means carried by the picking means, said gathering means being positioned with the ground engaging ends substantially in transverse alignment with the front rolling support.

57. A device as set forth in claim 56, in which conveying means are mounted on the picker units for delivering corn rearwardly.

58. A device as set forth in claim 56, in which the picker units are individually adjustable about their pivots on the transverse support.

59. A device as set forth in claim 56, in which a divider for diverting stalks to the respective picker units is positioned forwardly of the front rolling support.

60. A device as set forth in claim 56, in which an elevator is mounted on the rear of the tractor and means are provided for conveying corn from the picker units to said elevator.

61. A corn harvesting machine comprising a tractor, rear wheels on said tractor adapted to run along adjacent rows of corn, a front rolling support for said tractor, said tractor having a narrow longitudinally and centrally extending body portion, and picking means mounted at one side of the tractor intermediate the rear wheels and the front rolling support for gathering corn from the row at that side of the tractor.

62. A device as set forth in claim 61 in which the front rolling support is adapted to run between the adjacent rows.

63. A corn harvesting machine comprising the combination of a tractor having a transversely extended rear axle structure supported on wheels adapted to run along adjacent rows of corn, a narrow body extending forwardly from the center of the axle structure, a front rolling support on the body adapted to run between the adjacent rows, a laterally extending support on the body in advance of the rear wheels, a picking unit pivotally mounted at one side of the tractor on said support, said unit being operable to pick corn from one of the adjacent rows at its side of the tractor, and gathering means carried by the picking unit, said means being positioned with the ground engaging ends substantially in transverse alignment with the front rolling support.

64. A device as set forth in claim 63, in which an elevator is mounted at the rear of the tractor and means are provided for conveying corn from the picker unit to said elevator.

65. A self propelled harvester comprising a tractor having a relatively narrow body supported on rear traction wheels and a front truck of a width not greater than the width of the tractor body, two harvesting mechanisms positioned on opposite sides of the tractor body in close proximity thereto and adjacent said truck, said mechanisms being rockable in a vertical plane about a transverse axis located rearwardly of said truck and forwardly of said traction wheels, members rockably mounted on the tractor, lifting connections from said members to said harvesting mechanisms respectively, and means for rocking said members for adjusting the vertical position of said harvesting mechanisms.

66. The combination with a tractor having a front steering truck, rear traction wheels and a narrow longitudinally extended body, of a row crop harvesting unit including housings located at each side of the body between the front truck and the rear wheels and disposed substantially within the tread lines of the traction wheels, means on the body between the axes of the front and rear wheels for supporting one end only of each of the housings in laterally spaced relation to the body, and means connected with the other ends of said housings for supporting the same.

67. The combination with a tractor having a front steering truck, rear traction wheels, and a narrow longitudinally extended body, of a row crop harvesting unit including housings located on each side of the body between the front truck and rear wheels, means on the body serving as a supporting framework for supporting one end of each of the housings in laterally spaced relation to the body, and additional supporting means connected with the other ends of said housings.

68. A tractor propelled corn harvester comprising two sets of snapping rolls carried by the tractor, one on each side and opposite the steering means thereof, two longitudinally extending conveyors positioned on opposite sides of the tractor, one for each set of rolls, for conveying the ears of corn from the rolls to the rear of the tractor, chutes extending downwardly and inwardly from the ends of said conveyors, means pivotally mounting said snapping rolls and conveyors on said tractor, and an elevator at the rear of the tractor and centrally thereof for receiving the ears from the conveyors and for delivering them into a wagon.

69. A self propelled harvester comprising a tractor having a relatively narrow body supported on rear traction wheels and a front truck of a width not greater than the width of the tractor body, two harvesting mechanisms, each mechanism being pivotally connected to the tractor for movement relative thereto about a transverse axis and each comprising a downwardly and forwardly inclined gathering means and rearwardly extending conveying means associated therewith in a fixed position, said mechanisms being positioned on opposite sides of the tractor body in close proximity thereto, with the gathering means on opposite sides of said truck, and an elevator detachably mounted at the rear of said tractor and positioned to receive crop from said conveyors.

70. A tractor propelled row crop harvester comprising two harvesting mechanisms pivotally mounted on opposite sides of the tractor in close proximity thereto, each mechanism comprising gathering mechanism positioned near the front of the tractor and a conveyor extending rearwardly therefrom for receiving crop from said gathering means and conveying it to the rear of the tractor, an elevator at the rear of the tractor and positioned substantially on the longitudinal center line of the tractor, and chutes carried at least in part by said pivoted harvesting mechanisms and extending downwardly and inwardly from the end of said conveyors for conducting crop from the end of said conveyors into said elevator.

71. A self propelled harvester comprising a tractor having a relatively narrow body supported on rear traction wheels and a front truck of a width not greater than the width of the tractor body, two crop gathering mechanisms on opposite sides of the tractor body positioned in the vicinity of said truck and in close proximity thereto to operate on adjacent rows, said mechanisms being pivotally connected to the tractor for movement about a common transverse axis to raise and lower the front ends thereof, a longitudinally extending conveyor extending rearwardly from each mechanism and disposed in close proximity to the tractor body for conveying the crop from said mechanisms to the rear of the tractor, and means at the rear of the tractor for receiving the crop from said conveyors.

72. A harvesting machine comprising a tractor, rear wheels on said tractor adapted to run along adjacent plant rows, a front rolling support for said tractor, said tractor having a narrow longitudinally and centrally extending body portion, and picking means pivotally mounted at one side of the tractor intermediate the rear wheels and the front rolling support for gathering crop from the row at that side of the tractor.

73. A corn harvesting machine comprising the combination of a tractor having a transversely extending rear axle structure supported on wheels adapted to run along adjacent rows of corn, a narrow body extending forwardly from the center of the axle structure, a front rolling support on the body adapted to run between the same rows, means carried by the tractor and serving as pivot supports, picking means pivotally mounted on said supports, said picking means being operable to pick corn from adjacent rows, and gathering means carried by the picking means, said gathering means being positioned wtih the ground engaging ends substantially in transverse alignment with the front rolling support.

WILLIAM B. THIEMAN.